(12) United States Patent
Gelon et al.

(10) Patent No.: US 7,113,851 B1
(45) Date of Patent: Sep. 26, 2006

(54) PRACTICAL ORBIT RAISING SYSTEM AND METHOD FOR GEOSYNCHRONOUS SATELLITES

(76) Inventors: Walter Gelon, 622 Island Pl., Redwood City, CA (US) 94065; Ahmed Kamel, 1645 Candace Way, Los Altos, CA (US) 94024; Darren Stratemeier, 857 Portwalk Pl., Redwood City, CA (US) 94065; Sun Hur-Diaz, 4307 Shoal Creek Blvd., Austin, TX (US) 78756

( * ) Notice: Subject to any disclaimer, the term of this patent is extended or adjusted under 35 U.S.C. 154(b) by 0 days.

(21) Appl. No.: 09/328,911

(22) Filed: Jun. 9, 1999

(51) Int. Cl.
*G06F 19/00* (2006.01)
*G06F 169/00* (2006.01)
*G01N 15/08* (2006.01)
*B64G 1/00* (2006.01)

(52) U.S. Cl. ............ 701/13; 701/3; 701/4; 701/226; 701/222; 244/158.5

(58) Field of Classification Search ............ 701/3, 701/4, 13, 222, 226; 244/158 R, 158.5
See application file for complete search history.

(56) References Cited

U.S. PATENT DOCUMENTS

| T100,604 | I4 | * | 5/1981 | Crill et al. ............ 244/158 R |
| 5,067,672 | A | * | 11/1991 | Bouzat ............ 244/158 R |
| 5,349,532 | A | * | 9/1994 | Tilley et al. ............ 701/226 |
| 5,452,869 | A | * | 9/1995 | Basuthakur et al. ............ 244/164 |
| 5,595,360 | A | * | 1/1997 | Spitzer ............ 244/158 R |
| 5,596,360 | A |   | 1/1997 | Spitzer ............ 244/158 R |
| 5,681,011 | A | * | 10/1997 | Frazier ............ 244/164 |
| 5,716,029 | A | * | 2/1998 | Spitzer et al. ............ 244/158 R |
| 5,810,295 | A | * | 9/1998 | Anzel ............ 244/158 R |
| 5,992,799 | A | * | 11/1999 | Gamble et al. ............ 244/164 |
| 6,032,904 | A | * | 3/2000 | Hosick et al. ............ 244/169 |
| 6,186,446 | B1 | * | 2/2001 | Tilley et al. ............ 244/158 R |
| 6,543,723 | B1 | * | 4/2003 | Oh ............ 244/158.5 |

OTHER PUBLICATIONS

Porte, F. "Benefits of Electric Propulsion for Orbit Injection of Communication Satellites", American Institute of Aeronautics and Astronautics Paper 92-1955, 14th AIAA International Communication Satellite Systems Conference and Exhibit (Mar. 22-26, 1992).*

* cited by examiner

*Primary Examiner*—Thomas G. Black
*Assistant Examiner*—Brian J. Broadhead (57) ABSTRACT

A practical orbit raising method and system wherein a satellite quickly escapes the Van Allen radiation belts and payload mass and mission life are maximized. A satellite is launched that contains high thrust chemical propulsion thrusters, high specific impulse electric propulsion thrusters and a solar array. The satellite quickly escapes the Van Allen radiation belts by firing the high thrust chemical propulsion thrusters at apogees of intermediate orbits, starting from the transfer orbit initiated by a launch vehicle, to successively raise the perigees until the perigee clears the Van Allen radiation belts. The payload mass and mission life are maximized by firing high specific impulse electric propulsion thrusters to raise the satellite to near synchronous orbit, while steering the thrust vector and solar array to maintain the sun's illumination on the solar array. The chemical and/or electric propulsion thrusters are then fired to achieve geosynchronous orbit.

26 Claims, 8 Drawing Sheets

Fig. 2
(PRIOR ART)

ORBIT WITH NEAR GEOSYNCHRONOUS SEMI-MAJOR AXIS

Fig. 8
TYPICAL IN-PLANE THRUSTING PROFILE

Fig. 9
TYPICAL OUT-OF-PLANE THRUSTING PROFILE

STEERING WHEN RESULTANT THRUST
VECTOR IS NOT NORMAL TO SOLAR ARRAY AXIS

- SHOWN FOR THRUSTER(S) OPERATING ON
  ONE SIDE OF THE SATELLITE (SOUTH)

- RESULTANT THRUST VECTOR SHOWN COINCIDENT
  WITH DESIRED THRUST VECTOR

EFFECT AT PERIGEE (REGION III)

Fig. 14

EFFECT AT APOGEE (REGION II)

Fig. 15

PRACTICAL ORBIT RAISING SYSTEM AND METHOD FOR GEOSYNCHRONOUS SATELLITES

BACKGROUND

The present invention relates generally to satellites, and more particularly, to systems and methods that raise the orbit of a satellite to geosynchronous orbit.

The assignee of the present invention manufactures and deploys spacecraft that orbit the earth. For satellites that are placed in geosynchronous orbit, the Van Allen radiation belts pose hazards for the satellite caused by radiation, and the like.

U.S. Pat. No. 5,595,360 entitled "Optimal Transfer Orbit Trajectory Using Electric Propulsion" addresses orbit raising maneuvers of satellites. Such prior art orbit raising techniques limit orbit maneuvers in terms of location and attitude to achieve and maintain the orbital semi-major axis near the geosynchronous value so that the satellite can be continuously observed from a single ground station. U.S. Pat. No. 5,716,029 entitled "Constant Sun Angle Transfer Orbit Sequence and Method Using Electric Propulsion" discloses a technique that adjusts the inertial attitude periodically while maintaining a fixed direction of electric propulsion thrust firing throughout each orbit. Prior art techniques also do not steer the thrust vector while also steering the satellite's attitude during the orbit to maintain the sun's illumination on the solar arrays of the satellite during orbit raising maneuvers. Steering the thrust vector maximizes efficiency of the delivered thrust thus minimizing fuel and time to achieve the desired final orbit.

Therefore, it would be advantageous to have improved systems and methods that raise the orbit of a satellite to geosynchronous orbit. It would also be advantageous to have improved systems and methods to minimize exposure of the satellite to the hazards of the Van Allen radiation belts.

SUMMARY OF THE INVENTION

To meet the above and other objectives, the present invention provides for a practical orbit raising method and apparatus wherein a satellite quickly escapes the Van Allen radiation belts while simultaneously maximizing payload mass and mission life. The satellite quickly escapes the Van Allen radiation belts by firing high thrust chemical propulsion thrusters at apogees of intermediate orbits, starting from the transfer orbit initiated by a launch vehicle, to successively raise each orbit's perigee until the perigee clears the Van Allen radiation belts. The payload mass and mission life of the satellite are maximized using high specific impulse electric propulsion thrusters to continue raising the satellite to near geosynchronous orbit. The chemical and/or electric propulsion thrusters are then used for final touch-up to achieve geosynchronous orbit Chemical thruster controlled orbit maneuvers allow the satellite to quickly escape the Van Allen radiation belts and avoid hazardous effects on the satellite electronics and minimize solar array power degradation due to radiation. Electric propulsion thrusters are used while steering the thrust vector and solar array to expedite final station acquisition and maintain the sun's illumination on the solar arrays onboard the satellite. Steering the thrust vector around the orbit (except for preplanned coast arcs) maximizes efficiency of delivered thrust at any orbit location and thus minimizes both the fuel required and the time to achieve the desired final orbit. Chemical and/or electric propulsion thrusters may selectively be used for final orbit adjustment to achieve the desired final station location.

The present invention does not have the restrictions of prior art orbit raising techniques, and causes the satellite to quickly escape the hazardous Van Allen radiation belts and expeditiously acquire final orbital location while steering the thrust vector and solar array to maintain the sun's illumination on the solar arrays to perform maneuvers.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
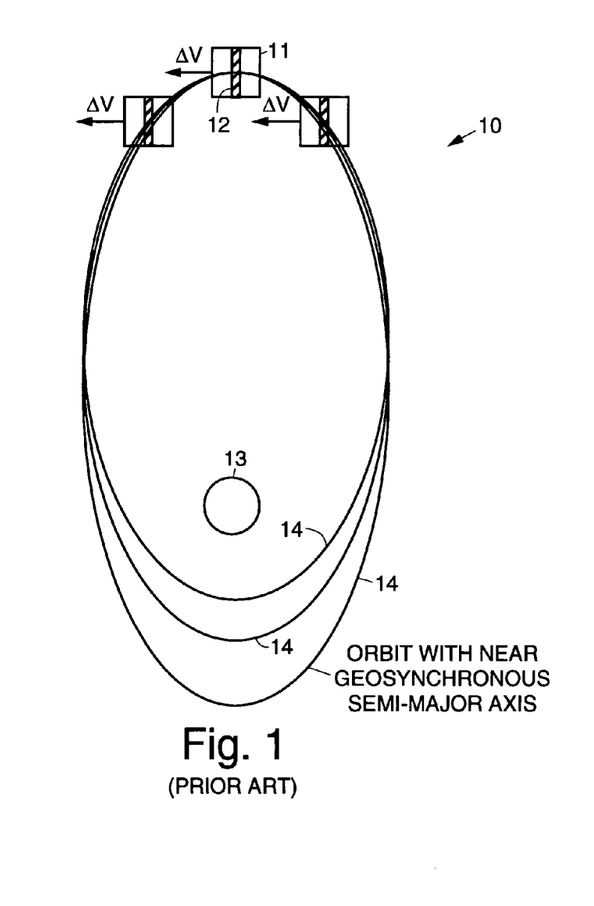
FIG. 1 illustrates a chemical thruster orbit raising strategy used in a conventional satellite orbit raising method.
Figure 2:
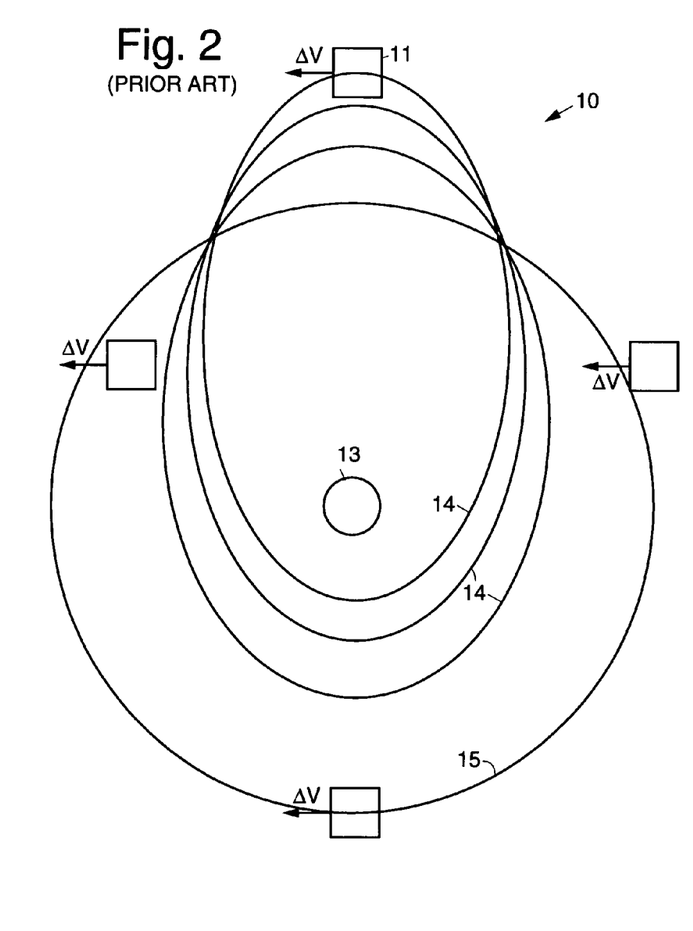
FIG. 2 illustrates a conventional electric propulsion maneuver strategy used in a conventional satellite orbit raising method.

Referring to the drawing figures, FIG. 1 illustrates a conventional thruster orbit raising strategy and FIG. 2 illustrates a conventional electric propulsion maneuver strategy used in a conventional satellite orbit raising method 10 that raises a satellite 111 (or spacecraft 11) from a transfer orbit 14 to geosynchronous orbit 15. In the conventional method 10, in the chemical orbit raising strategy and the electric propulsion maneuver strategy, the orbit maneuvers are limited in terms of location and attitude to achieve and maintain the semi-major axis of the orbit near the desired geosynchronous value. Thus, the satellite 11 may be continuously observed from a single ground station on the Earth 13. The prior art strategy also does not steer the thrust vector during the orbit while also steering the solar arrays to maintain the sun's illumination on solar arrays 12 of the satellite 11 during the orbit raising maneuvers.

Figure 3:
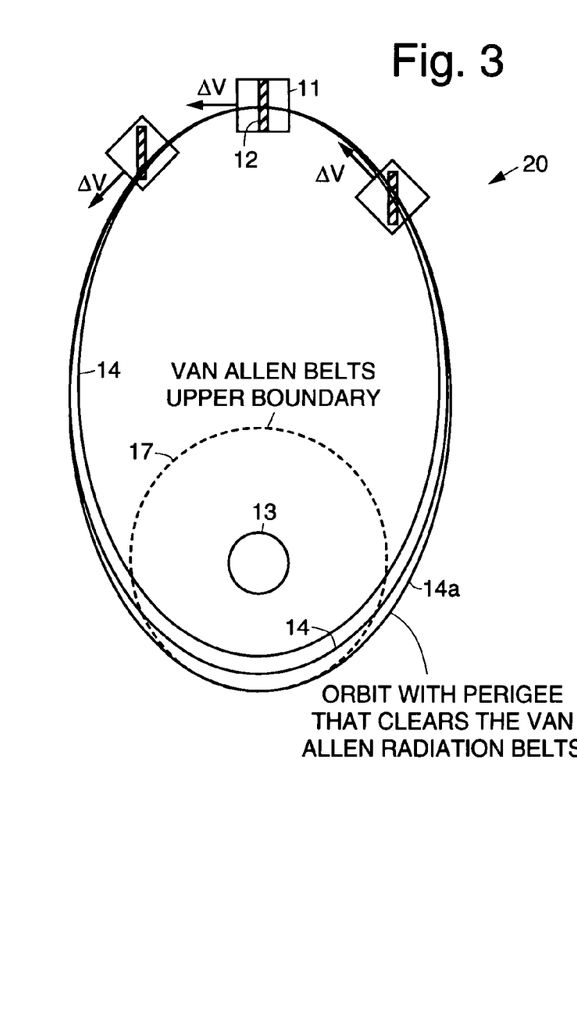
FIG. 3 illustrates an exemplary chemical thruster orbit raising strategy in accordance with the present invention used the present satellite orbit raising method.
Figure 4:
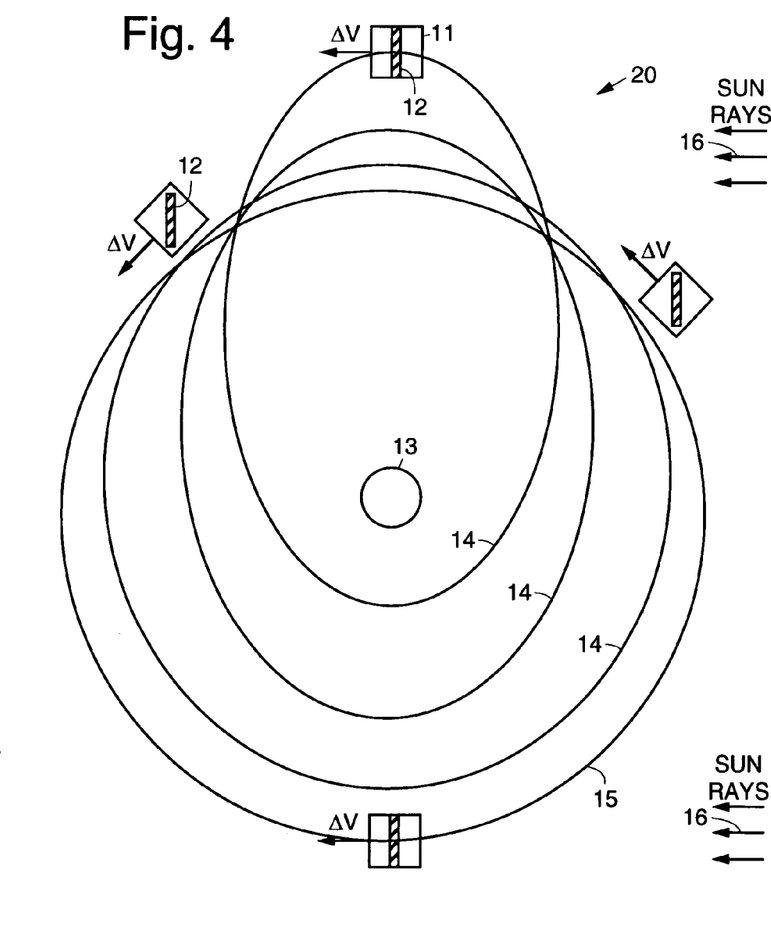
FIG. 4 illustrates an exemplary electric propulsion maneuver strategy in accordance with the present invention used in the present satellite orbit raising method.

FIG. 3 illustrates an exemplary chemical thruster orbit raising strategy and FIG. 4 illustrates an exemplary electric propulsion maneuver strategy that are used to implement a satellite orbit raising method 30 in accordance with the principles of the present invention. The present satellite orbit raising method 30 raises a satellite 11 from a transfer orbit 14 to geosynchronous orbit 15. The transfer orbit 14 may comprise a synchronous orbit, a subsynchronous orbit or a supersynchronous orbit.

In the present method 30, using the present chemical thruster orbit raising strategy, the orbit of the satellite 11 is raised until the transfer orbit 14 clears the Van Allen radiation belts 17 (illustrated by transfer orbit 14a). The chemical thruster orbit raising strategy may steer the thrust vector ($\Delta V$) as shown in FIG. 3. In practice, a small amount of additional radiation impacting the satellite 11 and solar array might be acceptable as the satellite 11 dips into the vary tops of the Van Allen radiation belts at the beginning of the electric propulsion orbit raising phase and would not change the fundamental nature of the present invention. The present electric propulsion maneuver strategy is used to expedite final geosynchronous orbit acquisition by steering the thrust vector ($\Delta V$) while maintaining the illumination of the sun's rays 16 on the solar arrays 12 of the satellite 11. Steering of thrust vector is implemented using a satellite steering profile.

Figure 5:
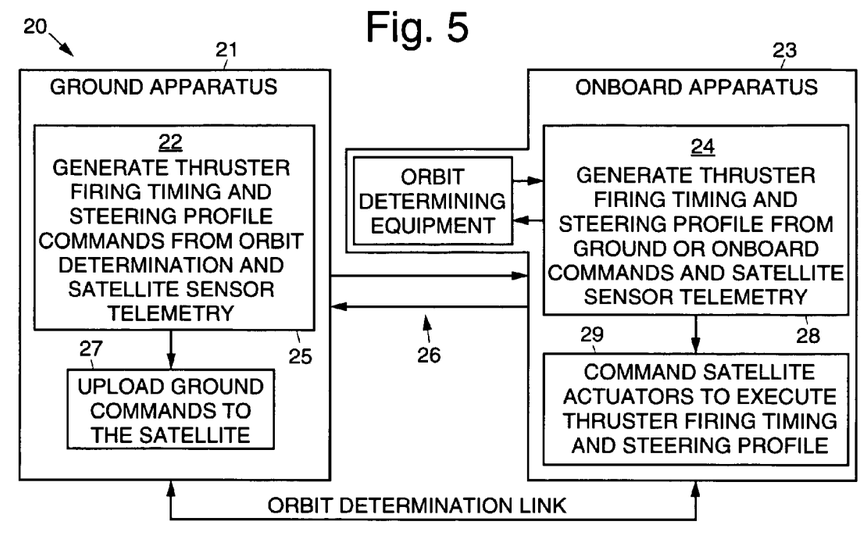
FIG. 5 illustrates an exemplary system in accordance with the principles of the present invention for raising the orbit of a satellite to geosynchronous orbit.

FIG. 5 illustrates an exemplary system 20 in accordance with the principles of the present invention that may be used to implement the present method 30 to raise the orbit of the satellite 11 to geosynchronous orbit 15. The system 20 includes apparatus 21 and software 22 that generate thruster profiles and the satellite steering profile on the earth 13 and apparatus 23 and software 24 generate thruster profiles and the satellite steering profile onboard the satellite 11. The thruster firing profile generated on the Earth 13 is uplinked to the satellite 11.

The apparatus 21 on the earth 13 includes a processor 25 that generates thruster firing timing and steering profile commands. The thruster firing timing and steering profile commands are derived from orbit determinations made using the software 22 that runs on the processor 25 and satellite sensor telemetry received on the ground by way of a communications link 26 and processed by the processor 25. The processor 25 outputs the ground-generated commands to communication apparatus 27 which uploads the commands to the satellite 11 by way of the communications link 26.

The apparatus 23 onboard the satellite 11 includes a processor 28 that generates thruster firing timing and steering profile commands. The thruster firing timing and steering profile commands from the apparatus 21 on the earth 13 (or apparatus onboard the satellite 11) and satellite sensor telemetry generated onboard the satellite 11 are processed using the software 29 that runs on the processor 28 onboard the satellite 11. The processor 28 commands satellite actuators (not shown) to execute the thruster firing timing and steering profile generated onboard the satellite 11.

Figure 6:
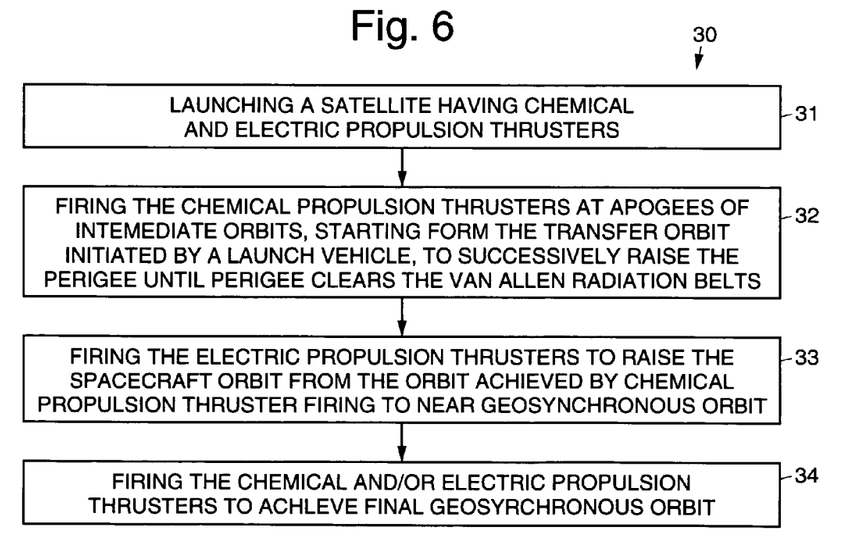
FIG. 6 illustrates an exemplary method in accordance with the principles of the present invention for raising the orbit of a satellite to geosynchronous orbit.

FIG. 6 illustrates an exemplary method 30 in accordance with the principles of the present invention. The present invention provides for a satellite maneuvering method 30 that is used to raise a satellite 11 from a transfer orbit initiated by a launch vehicle (not shown) to geosynchronous orbit 15. The present method 30 comprises the following steps.

A satellite having chemical and electric propulsion thrusters is launched 31. Chemical propulsion thrusters are fired 32 at apogees of intermediate orbits, starting from the transfer orbit initiated by a launch vehicle, to successively raise the perigee of the orbit until the perigee clears the Van Allen radiation belts (FIG. 3). Chemical propulsion maneuvers may also take place at perigee to raise the apogee of the transfer orbit 14 (called a perigee velocity assist) but these are not shown. Electric propulsion thrusters are fired 33 to raise the orbit of the satellite 11 from the orbit achieved by the chemical propulsion thruster firings 32 to near geosynchronous orbit 15 (FIG. 4). The chemical and/or electric propulsion thrusters are fired 34 to achieve the final geosynchronous orbit 15.

In order to minimize satellite hardware cost, some electric propulsion systems may be designed to perform both orbit raising and on-orbit stationkeeping functions. In this case, the designer may select the thrust vector cant angle from the axis of the solar array to optimally perform these two functions.

For orbit raising, the optimal thrust vector is the one that is normal to the axis of the solar arrays (see FIG. 4) so that maximum sun illumination on the solar arrays is obtained all the time. This can be achieved by steering the thrust vector and slewing the solar arrays to drive the sun vector to be normal to the solar arrays.

On the other hand, for on-orbit stationkeeping, the optimal thrust vector is the one that is canted an angle $\gamma$ from the axis of the solar arrays. This is illustrated with reference to FIG. 3 of copending U.S. patent application Ser. No. 09/207,399, filed Dec. 8, 1998, entitled "Practical Method and Apparatus for Satellite Stationkeeping", assigned to the assignee of the present invention. Therefore, to optimally perform both orbit raising and stationkeeping, the electric thrusters must be mounted on platforms such that the thrust vector is substantially normal to the solar array axis during orbit raising, and after orbit raising is completed, the platforms are then rotated such that the thrust vector becomes canted at an angle $\theta$ to the axis of the solar arrays, as shown in FIG. 3 of the above-identified patent application.

Because the adjustable platforms can be expensive, the orbit raising and stationkeeping may be performed with the thrusters canted at the angle $\gamma$ at the expense of extending the orbit raising duration. This is because the optimal thrust vector steering strategy may cause the sun to be at an angle to the solar array so that not enough solar array power is available to perform the maneuvers. In this case, the thrust vector steering profile should be based on the constraint that the sun angle relative to solar array must provide sufficient solar array power to perform the maneuvers while the thrust vector is steered to achieve the mission objective (e.g., minimum propellant, minimum time).

The orbit raising mission is designed to transfer a satellite 11 from the launch vehicle's injection orbit to the final geosynchronous orbit and place it at the desired on-station Earth longitude location. Each phase of the mission can be optimized for its individual propulsion system's performance parameters but the best practical solution is a tradeoff that maximizes useful satellite mass delivered to final orbit while minimizing mission risk, complexity and cost for an acceptable transfer orbit duration (TOD).

The mission phases are:
I. Injection: In this phase, a launch vehicle lifts the satellite 11 from Earth to the injection orbit.
II. Chemical orbit raising: In this phase, onboard chemical propulsion transfers the satellite 11 from the injection orbit to the optimal starting orbit for electric propulsion orbit raising: the initial transfer orbit.
III. Electric orbit raising (EOR): In this phase, onboard electric propulsion raises the satellite 11 from the initial transfer orbit to the final transfer orbit (or drift orbit).
IV. Final touchup: In this phase, chemical and/or electric propulsion transfers the satellite 11 from the drift orbit to the operational geostationary orbit at the desired station longitude.

Transfer orbit duration (TOD) with electric propulsion thrusters may be measured in months (compared to days for chemical thrusters) but the improved useful mass in final orbit can be worth the wait and expense of this long time period. However companies who provide satellite communications services do not want to spend unnecessary time and expense when using low thrust electric propulsion to slowly transfer the satellite 11 to its final on-orbit location. Any delay in starting commercial use of the communications payload to generate income can be significant. It is clear that any system which does not effectively use the limited electric propulsion resource and unnecessarily increases the time to reach final orbit is not desirable.

Since acceleration produced by electric thrusters is very small it is important not to waste this limited resource. Thus it is usually desirable to point an electric thruster in a direction that produces optimal transfer characteristics; typically one that minimizes TOD. For continuously operating electric thrusters the minimum fuel transfer also minimizes the TOD (and maximizes useful satellite mass) when the thrusters are optimally pointed throughout the orbit. A desirable use of electric thrusters for orbital transfer would then have continuous operation (except perhaps during eclipses or other planned coast arcs) around the entire orbit with a steered attitude profile that was continuously reoriented to point in a direction that minimizes TOD. Allowing coast arcs during less efficient thrusting parts of the orbit improves fuel usage and allows calibration of attitude sensors but at the expense of increased TOD.

An improved utilization of electric propulsion is outlined in FIGS. 7–15 and the tables included herein. These figures and tables illustrate a transfer orbit process that is optimized for a specific launch vehicle lift capability; a given chemical propulsion system and propellant loading; and a specific electric propulsion system (such as a Stationary Plasma Thruster, SPT, using xenon as a fuel). However, the following description holds for other types of electric thrusters and other launch vehicles or combinations of these components of an orbit raising mission to, or near, geosynchronous equatorial or even medium Earth orbits or low Earth orbits. It would also hold if electric propulsion were utilized to adjust the orbit of a satellite 11 around other planets or the moon.

Figure 7:
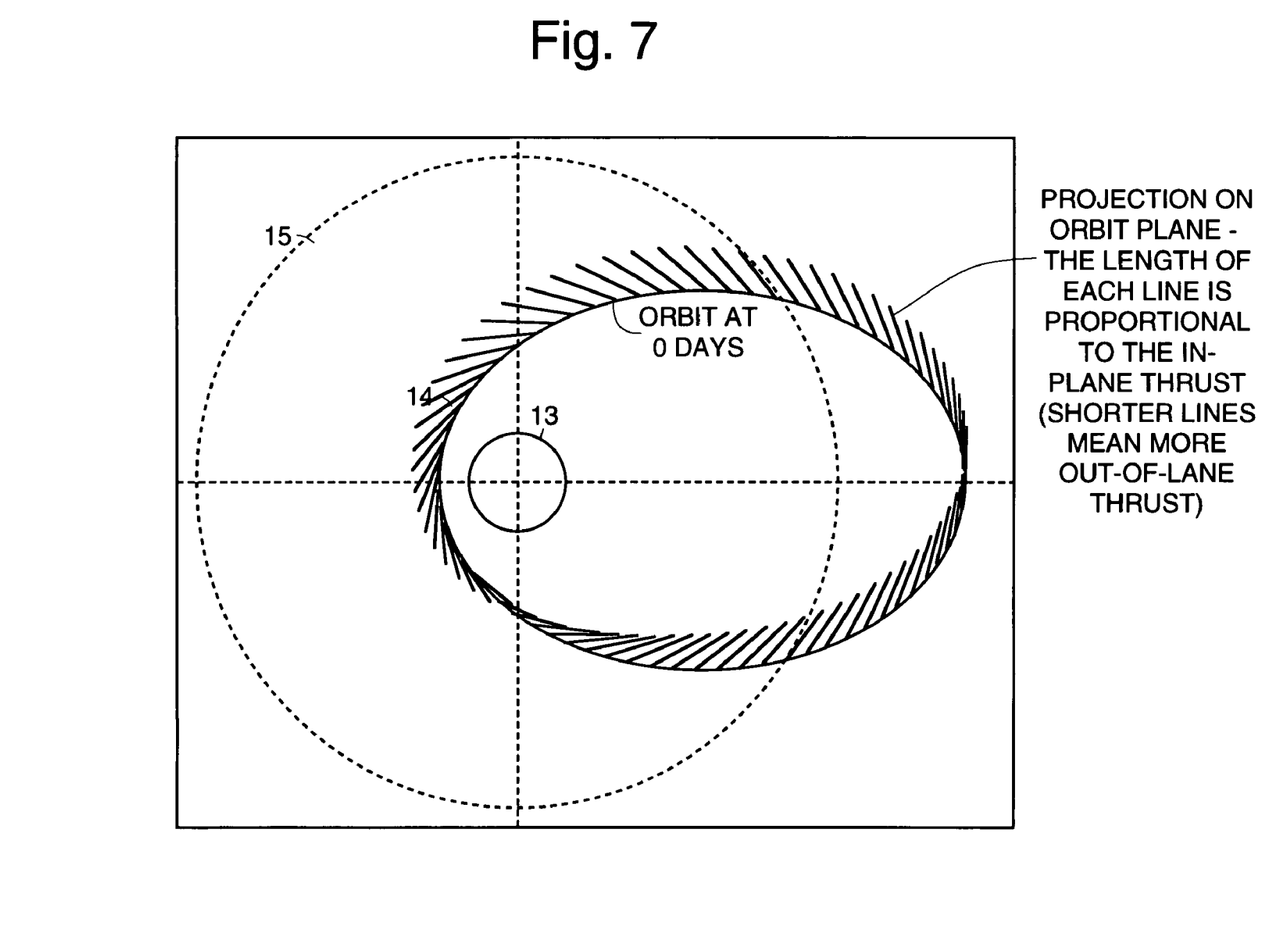
FIG. 7 illustrates an exemplary electric propulsion thrust vector steering profile in accordance with the principles of the present invention for raising the orbit of a satellite to geosynchronous orbit.

FIG. 7 indicates a typical starting orbit for the electric propulsion orbit raising phase of a "launch vehicle injection-chemical orbit raising-electric propulsion orbit raising-chemical propulsion touchup" mission, optimized to minimize TOD for the electric orbit raising phase of a mission to geosynchronous equatorial orbit. As the allowable TOD gets longer the three main parameters defining the starting orbit will change: apogee radius and inclination increase while perigee radius decreases. For short orbit raising times the starting apogee is slightly supersynchronous, the perigee subsynchronous and the inclination small, but finite. However as the flight times increase all three of these parameters start out further from the final orbit destination; for long TOD the starting orbit inclination for electric propulsion transfer can be quite far from the desired final equatorial plane.

Figure 8:
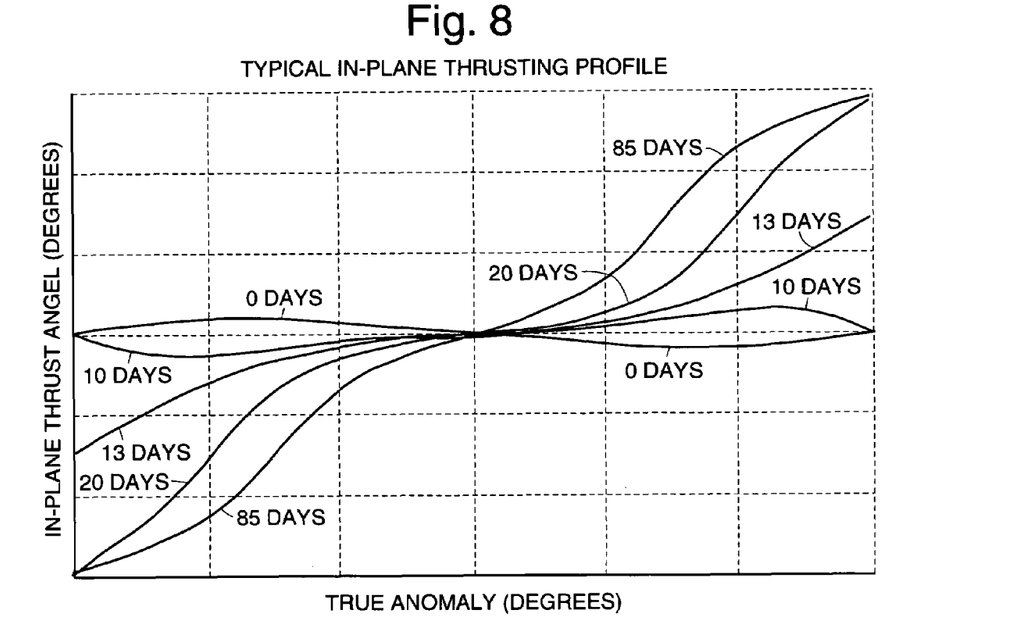
FIG. 8 illustrates an exemplary in-plane component of the thrust vector steering profile of FIG. 7.

FIG. 8 gives the optimal angle for in-plane thrust during the electric propulsion phase of a typical mission. The in-phase angle is measured from the normal to the local radius vector. In the starting orbit ("0 days" in the figure) the in-plane thrust vector direction is near zero degrees throughout that orbit. In other words, the optimal direction when thrusting continuously will raise apogee in addition to raising perigee. When near perigee (true anomaly near zero degrees) the in-plane component of the thrust vector is essentially along the velocity vector for rapid apogee raising. This direction is intuitively reasonable because using propellant early to move the apogee higher costs some fuel but permits more rapid perigee raising and inclination removal (saving fuel) for the portion of the orbit near apogee (true anomaly near 180 degrees). These transfer orbits are assumed to have no thrust coast periods for eclipses but the observations are still valid when they are accounted for in the thrust profile.

Figure 9:
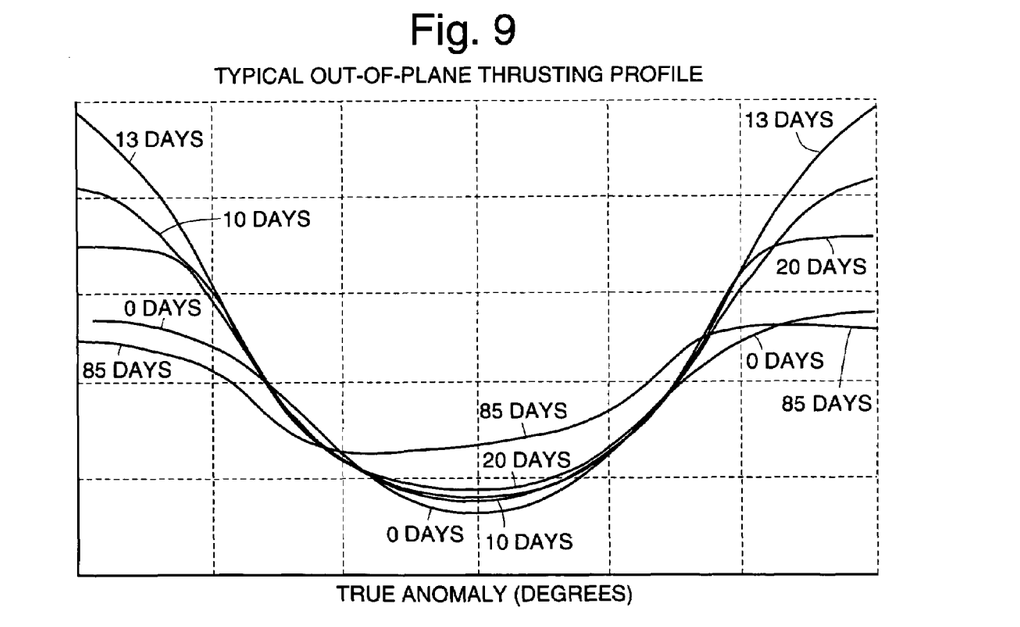
FIG. 9 illustrates an exemplary out-of-plane component of the thrust vector steering profile of FIG. 7.
Figure 10:
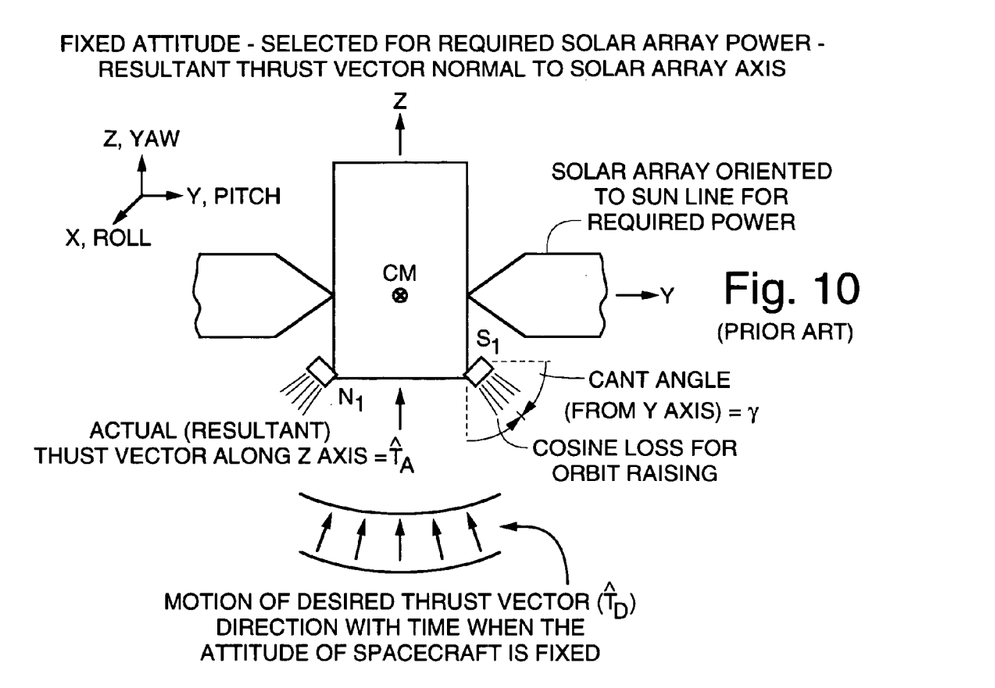
FIG. 10 illustrates an exemplary variation of the angle between the actual and desired thrust vectors when maintaining a fixed attitude used in a conventional satellite orbit raising method.
Figure 11:
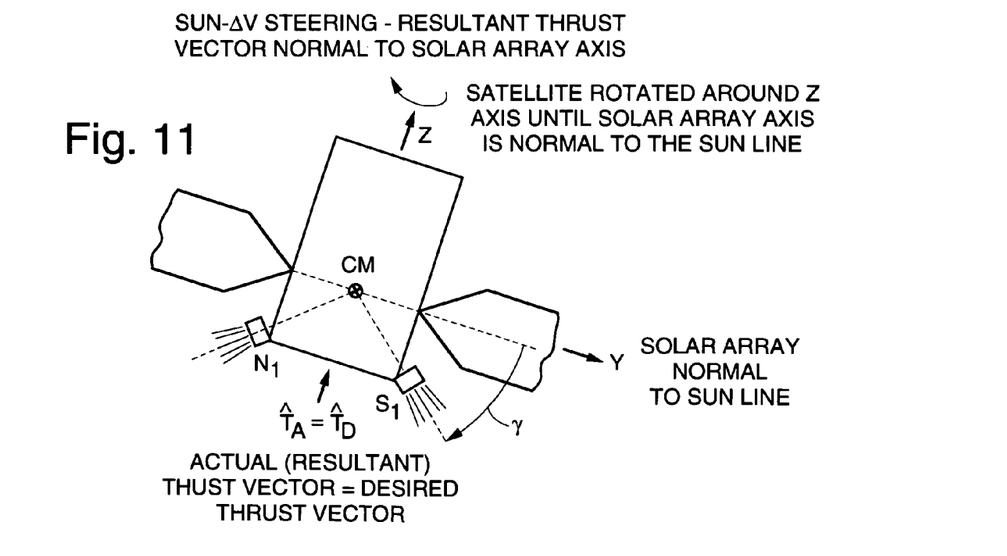
FIG. 11 illustrates a method of sun-AV steering used in U.S. patent application Ser. No. 09/328,091, filed Jun. 8, 1999.

The out-of-plane thrust angle in FIG. 9 is also of interest. Clearly it is advantageous to do some inclination removal at the orbital node near apogee (true anomaly of 180 degrees) but these optimized profiles show that it is advantageous to do some inclination removal at perigee where the other orbital node is located. In fact, the attitude profiles show that in the starting orbit of the electric orbit raising phase of the mission it is often desirable to raise both perigee and apogee while removing inclination throughout the orbit (except near the anti-nodes). FIG. 7 summarizes the thrust attitude direction profiles in another way. The lines at any orbit location are projections of the thrust vector on the orbital plane, i.e., they indicate the magnitude and direction of the in-plane thrust. The length of the line measures how much out-of-plane thrust is desired; shorter lines mean more out-of-plane. The inertial direction of thrust changes throughout the orbit. A fixed predetermined thrust attitude direction will not be optimal for TOD or fuel usage.

FIGS. 8 and 9 show the optimal thrust angle profiles for minimizing TOD, for a continuously operating thruster, as the mission progresses. It is clear that inclination is being removed throughout the entire 85 day mission at both perigee and apogee (not possible with a fixed attitude). As perigee approaches geosynchronous radius, out-of-plane electric propulsion thrust will be effective in removing inclination. The attitude profile in FIG. 9 indicates approximately 17 degrees for the out-of-plane thrust angle at perigee which costs less than 5 percent of in-plane thrust magnitude (a cosine loss) but gains 29 percent of thrust in the out-of-plane direction (a sine gain). Clearly restricting the thrust vector to a substantially fixed attitude after attaining a near geosynchronous semi-major axis does not take advantage of an electric propulsion system's ability to take out inclination through much of the later orbits in the orbit raising mission.

The methods for attaining geosynchronous orbit shown in U.S. Pat. Nos. 5,596,360 and 5,716,029 do appear to simplify the mission profile by permitting the orbiting satellite 11 to maintain a fixed attitude while undergoing propulsive maneuvers. The firing direction is chosen to enable the satellite 11 to remain in view of a single ground station by keeping the orbital period near 24 hours as the eccentricity decreases in the latter phases of the mission. However, the fixed nature of the "predetermined attitude," while generally required for spinning satellite 11 does not take advantage of the attitude maneuverability inherent in modern three-axis controlled satellites 11. U.S. patent application Ser. No. 09/382,091, filed Jun. 8, 1999 entitled "Automatic Sun-ΔV Steering During Long Duration Electric Orbit Raising" assigned to the assignee of the present invention teaches a methodology for orienting the actual thrust vector in the desired direction for optimal delivered velocity while simultaneously orienting the satellite 11 so the sun vector is normal to the solar arrays. In this disclosure the resultant thrust vector from the operating electric thrusters is assumed normal to the solar array axis. As an extension of those teachings the present patent describes the process when electric thruster alignments are such that the resultant thrust vector is not normal to the solar arrays.

The methods for attaining geosynchronous orbit shown in U.S. Pat. Nos. 5,596,360 and 5,716,029 also do nothing to address the practical problems involved with guiding the satellite 11 to its intended on-orbit location when faced with launch vehicle injection errors, variations in thruster performance, thrust attitude errors, interruptions in thrust profiles for trouble shooting problems such as thruster or power supply failures, orbit determination errors, or attitude control requirements such as momentum management. The final orbit of each mission phase will differ from the desired endpoint due to these and other unmodeled disturbances to the nominal mission plan. Guiding the satellite 11 back to a predetermined target orbit may be wasteful of fuel and increases transfer orbit duration (TOD), especially for very low thrusts produced by electric propulsion. Generally, an electric propulsion system wants to operate each thruster at maximum power (maximum thrust level) for best efficiency and minimum TOD. Operation at maximum thrust means it is not possible to speed up to reach the target and that fact complicates the guidance problem. An electric thruster's nominal operation could be throttled back to reserve some acceleration capability or special pre-planned coast periods may be added to the mission plan (these can then be shortened to deliver more ΔV) but these features concede increased TOD to maintain an acceleration capability. The EOR mission phase can be re-planned at any time to compensate for past disturbances but if the original plan was generated to minimize TOD then changes to the plan would again increase TOD.

As the orbit of the satellite 11 approaches the geosynchronous orbit period it becomes time consuming for electric propulsion thrusters to guide the satellite 11 to the On-Station Longitude in the final orbit because any disturbances to the predetermined plan can result in very long drift times (through the operational longitudes of other satellites) and increased TOD. As a practical matter it is best to leave the on-station guidance to chemical propulsion because of its relatively high acceleration capability.

A description of preferred embodiments follows.

A predetermined steering profile can be generated to take the satellite 11 from the EOR Initial Transfer Orbit to the Final Transfer Orbit. One choice for optimization could be to minimize the time to get to geosynchronous orbit (essentially zero eccentricity and zero inclination within the desired on-station longitude limits) without constraining intermediate orbital periods. A second choice could be to rapidly increase the semi-major axis and orbital period to near 24 hours (while still lowering inclination) so as to limit motion of the satellite 11 and allow continuous visibility to a single ground station. In the latter case, neither the inclination nor eccentricity upon reaching the 24 hour period has to be near zero to maintain single station visibility.

Any planned mission optimal profile is a function of the specific Electric Propulsion Subsystem (EPS) performance parameters including: type of electric thruster (such as a Stationary plasma thruster-S PT or arcjets or xenon ion propulsion), nominal thrust and power levels including variation over usage lifetime, throttling characteristics, specific impulse (Isp), number of thrusters operating, location of thrusters on the satellite 11, thruster gimbaling capability and thruster pointing directions.

The mission plan also depends on the ability of the solar arrays to generate enough power to run the satellite 11. The power generated should be sufficient to operate such things as the bus electronics equipment, provide heater power to keep the payload and batteries warm, supply power to charge the batteries in addition to providing power to operate the electric thrusters. If the resultant electric thrust is delivered nominally pointing along the z-axis of the satellite 11 (for example if both North and South side thrusters are firing simultaneously in FIG. 10) keeping the satellite 11 in a fixed attitude allows the solar arrays to be oriented to an acceptable angle from the sun but optimal steering profiles (typical values shown in FIGS. 8 and 9) cannot be maintained.

Alternatively, keeping the electric thrusters pointed in the direction of the desired thrust vector will move the solar arrays away from the sun-normal direction. Limited off-normal sun pointing is acceptable if the solar arrays generate enough power to compensate for approximate cosine loss in solar power output for off-normal sun. However, the preferred steering profile's thrust direction can still require far off-normal conditions. Some method of maintaining the good solar array performance, a positive power balance and good thermal balance with minimum compromise to the desired optimal thrust profile is needed.

A method of steering the continuously thrusting electric propulsion mission phase, called Sun-ΔV steering, is taught in U.S. patent application Ser. No. 09/328,091 filed Jun. 8, 1999. Thrusters are balanced by firing them in pairs on the +y and -y sides of the satellite 11 (North and South sides on orbit) so the resultant EOR thrust vector is oriented along the z-axis (FIG. 11) and rotational torque is nominally zero (the principles still apply if thrusters are pointed off the center of mass to provide momentum control during EOR). The satellite 11 is then rotated in yaw until the solar array (pitch) axis is normal to the sun line. As the satellite 11 proceeds through the transfer orbit the attitude is continuously reoriented to track the optimal thrust direction. In general, each individual thruster direction is not aligned with the z-axis of the satellite 11 because it is desirable to use the same EOR electric thrusters on-orbit to perform North/South stationkeeping (NSSK) maneuvers. Thrust effectiveness is decreased by the sine of the cant angle γ, resulting in wasted fuel and a longer TOD.

Figure 12:
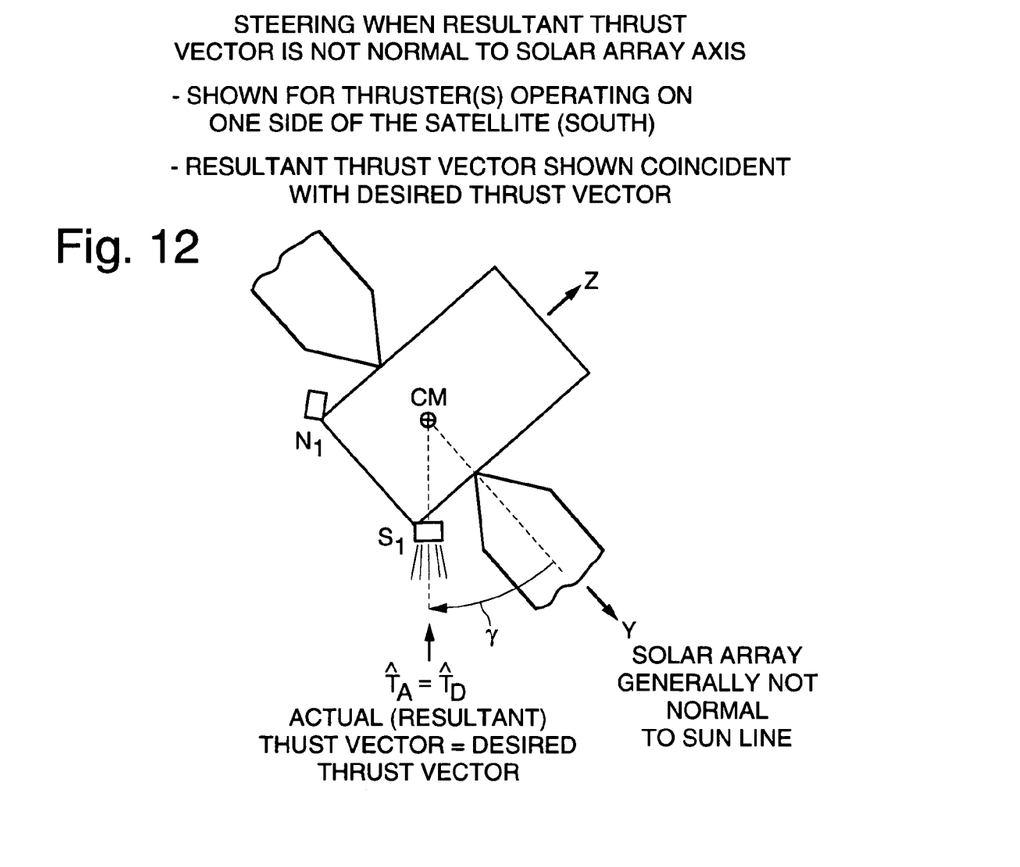
FIG. 12 illustrates a method of steering when the thrust vector is not normal to the solar array axis and the actual and desired thrust vectors are coincident.

Alternatively, the attitude control system may orient the satellite 11 so as to point the electric thrusters on one side of the satellite 11 in the direction of the desired thrust vector, as in FIG. 12. This orientation has essentially no thrust direction efficiency loss and TOD is minimized. Sun-AV steering may still be performed but at times the solar arrays are will be offset by the same cant angle γ from normal to the sun line. If the electric thruster offset angle is very large the solar array offset angle may not provide sufficient power to run the mission plan and the electric thrusters might have to be throttled back or even shut down entirely. Again TOD would increase.

Figure 13:
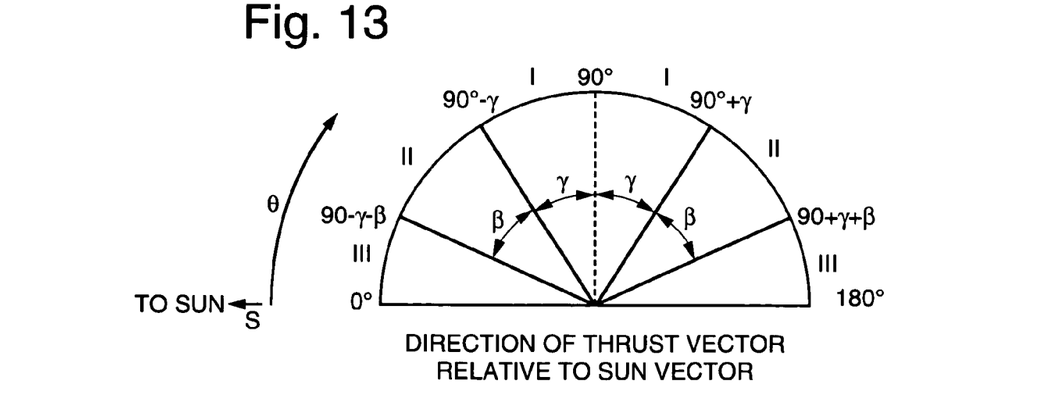
FIG. 13 illustrates a method of thrust vector steering in accordance with the principles of the present invention.

It is the teaching of the present invention that a method which offsets both the thrust vector and the solar array (pitch) axis from their individually optimal directions gives the best balance to the mission. It is also a teaching of the present invention that a practical system of electric orbit raising utilizes one electric thruster or a plurality of adjacent thrusters on the same side of the satellite 11 to maximize effective thrust. FIG. 13 which depicts the possible orientations of the sun vector relative to the desired optimal thrust vector.

Region I: As the satellite 11 travels around the transfer orbit if the angle between the desired thrust vector and the sun vector, $\theta$, is in Region I of FIG. 13 then the process becomes:

(a) Orient the satellite 11 so the actual thruster axis, Ta, is aligned with the desired thrust direction, Td.

(b) Define the other axes by rotating the satellite 11 around the actual thrust axis until the solar array axis (y-axis) is normal to the sun vector to provide full power from the arrays when the wings are rotated in azimuth to face the sun. The satellite 11 y-axis is then out of the S-Td plane by the angle $\lambda$ where:

$\cos(\lambda) = \cos(\gamma)/\cos(90-\theta)$, when $90-\gamma < \theta < 90+\gamma$.

Using this method provides both full power and full thrust when the desired thrust direction relative to the sun direction falls within Region I.

Region II: When the desired thrust direction relative to the sun direction is within Region II of FIG. 13 the sun angle is allowed to move off normal to the solar arrays but the actual resultants thrust is maintained along the desired thrust direction.

The process is:

(a) Orient the satellite 11 so the actual resultant thrust direction, Ta, is aligned with the desired thrust direction, Td.

(b) Rotate the satellite 11 around the actual thrust axis until the solar array axis (y-axis) is in the S-Td plane where the wings are then rotated in azimuth to face the sun. The angle of the sun vector off normal to the solar array axis $\phi$ is:

$\phi = 90 - \gamma - \theta$, when $90 - \gamma - \beta < \theta < 90 - \gamma$ or $\phi = \theta - (90 + \gamma)$, when $90 + \gamma < \theta < 90 + \gamma + \beta$ Region III: When the desired thrust direction relative to the sun direction is within Region III of FIG. 13 the actual thrust axis is moved away from the desired thrust direction while keeping the sun vector off normal to the solar arrays but constrained at the allowable limit $\beta$. The process becomes:

(a) First align the satellite 11 axes so the actual resultant thruster axis, Ta, is along the desired thrust direction, Td.

(b) Rotate the satellite 11 coordinate axes around the actual thrust axis until the solar array axis (y-axis) is in the S-Td plane.

(c) Rotate the satellite 11 around its x-axis keeping the y-axis in the S-Td plane until the angle of the sun vector from normal to the solar array axis $\phi$ becomes:

$\phi = \beta$, when $0 < \theta < 90 - \gamma - \beta$, or $90 + \gamma + \beta < \theta < 180$ (d) The angle that the actual resultant thrust vector makes with the desired thrust vector, $\alpha$, is:

$\alpha = (90 - \beta - \gamma) - \theta$, when $90 < \theta < 90 - \gamma - \beta$ or $\alpha = \theta - (90 + \gamma + \beta)$, when $90 + \gamma + \beta < \theta < 180$.

In the above equations, $\gamma$ is the thruster cant angle from solar array axis (pitch or y-axis), $\beta$ is the maximum allowable sun angle from normal to solar arrays, S is the vector from satellite 11 to sun, Td is the vector from satellite 11 in direction of desired thrust, Ta is the vector from satellite 11 in direction of actual thrust, $\theta$ is the angle between the desired thrust vector and the sun vector (Td and S), and $\alpha$ is the angle between actual resultant thrust vector and desired thrust vector (Ta and Td).

As an example illustrating the effectiveness of the present invention, assume the thrusters are canted at $\gamma=40$ degrees from the solar array axis (a desirable direction for on-orbit North/South station keeping). Also assume the satellite 11 has a positive power balance during EOR when the sun is $\beta=23.5$ degrees (or less) from normal to the solar arrays (solar array effectiveness of cos[23.5] or 91.71 percent). FIG. 13 shows the definition of three Regions in the plane containing the sun (S) and desired thrust vectors (Td). Worst case thrust effectiveness of 89.49 percent would occur at the extremes of Region III if the desired thrust vector was along the sun vector; i.e., the actual delivered thrust differs from the desired thrust vector by (90−40−23.5)=26.5 degrees. The following table illustrates the thrust vector and sun vector for each of the regions illustrated in FIG. 13.

| Region | Thrust Vector | Sun Vector |
|---|---|---|
| I | Actual thrust is possible along desired thrust direction ($\alpha$ = deg) | Sun kept normal to solar arrays; with y-axis out of S-Td plane a maximum angle of $\gamma$ degrees |
| II | Actual thrust is possible along desired thrust direction ($\alpha$ = deg) | Sun up to $\beta$ degrees from normal to solar array; y-axis kept in S-Td plane |
| III | Actual thrust differs from desired thrust direction by $\alpha = (90 - \beta - \gamma)$deg) (maximum) | Sun exactly $\beta$ degrees from normal to solar array; y-axis kept in S-Td plane |

Suppose the example profiles of in-plane and out-of-plane optimal thrust angles for an entire 85 day mission are given in FIGS. 8 and 9. The following table summarizes a typical mid-mission orbit but assumes worst case angles to the sun at winter solstice.

| | Region III Perigee | Region I Anti-nodes | Region II Apogee |
|---|---|---|---|
| Typical in-plane thrust angles | −180 deg (opposite velocity) | 30 deg | 0 deg (along velocity) |
| Typical out-of-plane thrust angles | +25 deg | 0 deg | −25 deg |
| Minimum thrust effectiveness | 90.6% | 100% | 100% |
| Effectiveness of solar array | 91.71% | 100% | 99.97% |

Figure 14:
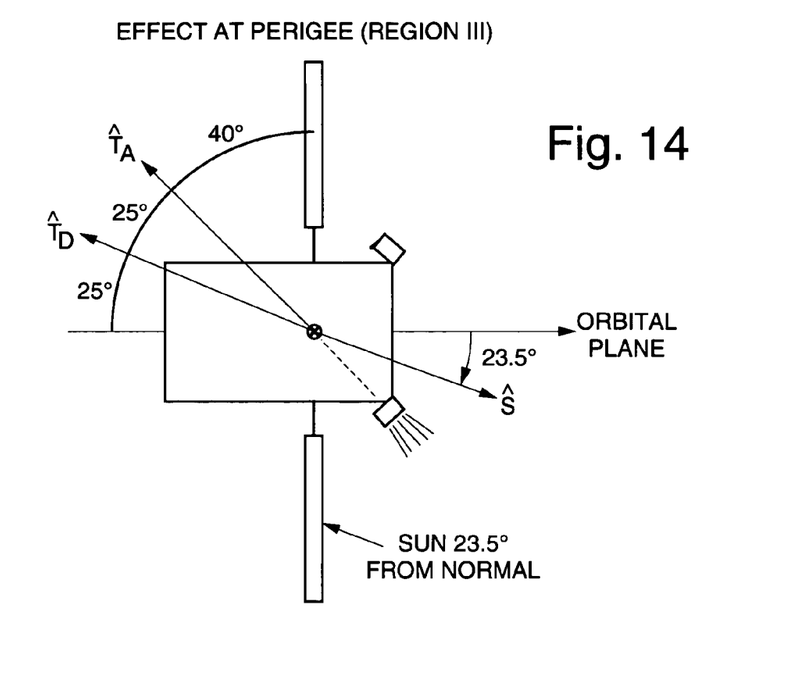
FIG. 14 illustrates the direction of the thrust and sun vectors at perigee of an exemplary electric propulsion orbit raising method in accordance with the principles of the present invention.

At perigee the geometry places the desired optimal thrust vector in Region III with the sun almost directly along Td (differing by only 1.5 degrees). FIG. 14 shows that the satellite 11 is oriented to the sun at the β limit of 23.5 degrees for an acceptable effectiveness of 91.71 percent while the actual resultant thrust vector is still 25 degrees away from the desired thrust vector direction yielding a 90.6 percent effectiveness factor. Note however this thrust "loss" is not totally wasted. The fact that the desired out-of-plane thrust angle is already 25 degrees indicates that it is desirable to remove some inclination at perigee so increasing the total angle to 50 degrees from the orbital plane must help by removing more inclination. Of course, those skilled in the art will recognize that Ta may be oriented more in-plane (but still at least 25 degrees from Td) if desired and still satisfy the β limit constraint if it were desirable to do a little more orbit raising and less inclination change but the concept of using adjacent thrusters to improve the thrust effectiveness is unchanged.

Figure 15:
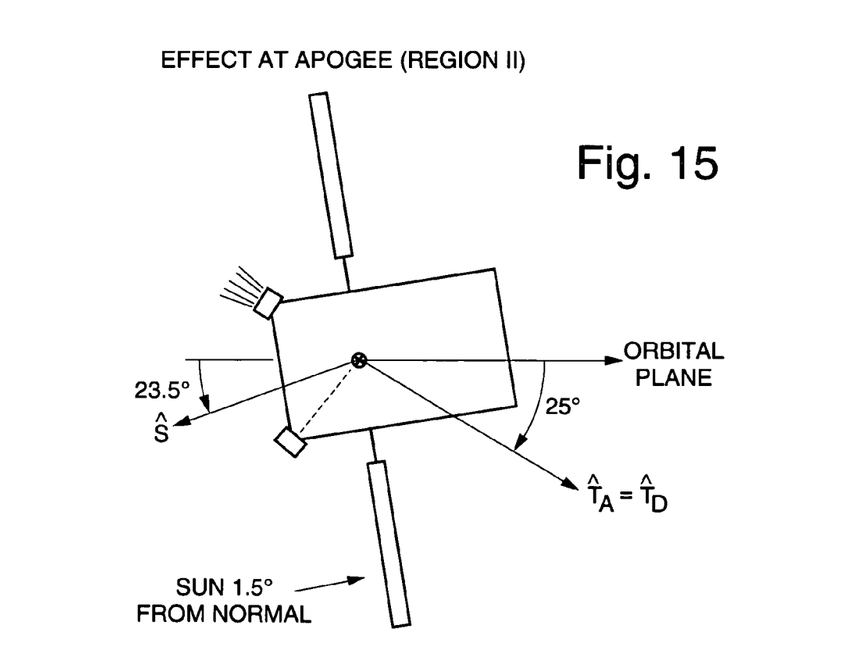
FIG. 15 illustrates the direction of the thrust and sun vectors at apogee of an exemplary electric propulsion orbit raising method in accordance with the principles of the present invention.

The situation at the anti-nodes, is illustrated in the preceding table, shows that there is no decrease of effectiveness for thrust or solar array because the geometry just discussed at perigee assures excellent geometry at the anti-nodes. In fact, the geometry at apogee must also be very good as is shown in FIG. 15. The actual resultant thrust can be delivered along the desired thrust direction with no loss while the sun is nearly normal to the solar arrays (1.5 degrees off normal gives a 99.97 percent effectiveness). In general the out-of-plane thrust angles in FIG. 9 which are typical for geosynchronous EOR missions thrust above the orbit plane at perigee and below the plane at apogee so the sun will not cause thrust losses at both places on the same orbit.

Examination of the typical thrust profiles in FIGS. 8 and 9 shows very little time when thrust effectiveness of adjacent thrusters is less than 100 percent. Even on the worst orbits the sun and desired thrust vectors could not be in Region III for even half an orbit. Bounding the average thrust effectiveness for these orbits by 95 percent would be extremely conservative.

Thus, systems and methods that raise the orbit of a satellite to geosynchronous orbit have been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A system for raising a spacecraft launched into a transfer orbit about the Earth from the transfer orbit to a geosynchronous orbit, comprising:
   a spacecraft comprising chemical and electric propulsion thrusters and a solar array;
   a processor onboard the spacecraft for:
   firing the chemical propulsion thrusters at apogees of intermediate orbits, starting from the transfer orbit initiated by the launch vehicle, to successively raise perigees of the orbit until the spacecraft perigee substantially clears the Van Allen radiation belts, and where the semi-major axis of the intermediate orbits is substantially less than the semi-major axis of a final orbit, and where the inclination of the intermediate orbits is substantially greater than the inclination of the final orbit;
   firing the electric propulsion thrusters to raise the orbit of the spacecraft from the orbit achieved by the chemical propulsion thrusters firing step to near geosynchronous orbit by steering the thrust vector both in-plane and out-of-plane while rotating the spacecraft body and steering the solar array to maintain the sun's illumination on the solar array, further comprising ground apparatus including a processor that determines a thruster firing profile for firing the thrusters and generates thruster firing commands that implement the thruster firing profile, and communication apparatus that uplinks commands to the spacecraft.

2. A method for raising a spacecraft launched into a transfer orbit about the Earth from the transfer orbit to a geosynchronous orbit, comprising the steps of:
   launching a spacecraft having chemical and electric propulsion thrusters and a solar array;
   firing the chemical propulsion thrusters at apogees of intermediate orbits, starting from the transfer orbit initiated by the launch vehicle, to successively raise perigees of the orbit until the spacecraft perigee substantially clears the Van Allen radiation belts, and where the semi-major axis of the intermediate orbits is substantially less than the semi-major axis of a final orbit, and where the inclination of the intermediate orbits is substantially greater than the inclination of the final orbit;
   firing the electric propulsion thrusters to raise the orbit of the spacecraft from the orbit achieved by the chemical propulsion thrusters firing step to near geosynchronous orbit by steering the thrust vector both in-plane and out-of-plane while rotating the spacecraft body and steering the solar array to maintain the sun's illumination on the solar array; and
   firing selected ones of the chemical and electric propulsion thrusters to achieve final geosynchronous orbit.

3. The method recited in claim 2 wherein the thrust vector is substantially normal to the axis of the solar array and the sun is maintained substantially normal to the solar array.

4. The method recited in claim 2 wherein the transfer orbit is a subsynchronous orbit.

5. The method recited in claim 2 wherein the transfer orbit is a supersynchronous orbit.

6. The method recited in claim 2 wherein a thruster firing profile for firing the thrusters is generated onboard the spacecraft.

7. The method recited in claim 2 wherein a thruster firing profile for firing the thrusters is generated on the Earth 13 and uplinked to the spacecraft.

8. The method recited in claim 2 wherein a spacecraft steering profile is generated on the Earth that steers the thrust vector ($\Delta V$) to maintain the illumination of the sun's rays substantially normal to solar array.

9. The method recited in claim 2 wherein a spacecraft steering profile is generated onboard the spacecraft that steers the thrust vector ($\Delta V$) to maintain the illumination of the sun's rays substantially normal to solar array.

10. The method recited in claim 2 wherein the step of firing the electric propulsion thrusters to raise the orbit of the spacecraft is periodically revised to compensate for disturbances experienced by the spacecraft.

11. The method recited in claim 2 wherein the step of firing the electric propulsion thrusters to raise the orbit of the spacecraft is completed prior to reaching a desired on-orbit location whereupon chemical propulsion thruster firings are used to guide the spacecraft to the final desired orbit position to compensate for disturbances experienced by the spacecraft.

12. The method recited in claim 2 wherein the step of firing the electric propulsion thrusters to raise the orbit of the spacecraft is completed upon reaching a desired on-orbit location and chemical propulsion thruster firings are interspersed with electric thruster operation to guide the spacecraft to the final desired orbit position to compensate for disturbances experienced by the spacecraft.

13. The method recited in claim 2 wherein the step of firing the electric propulsion thrusters to raise the orbit of the spacecraft includes operating the electric thrusters in a throttled-back mode to enable increased acceleration capability to cope with disturbances experienced by the spacecraft.

14. The method recited in claim 2 wherein the step of firing the electric propulsion thrusters to raise the orbit of the spacecraft comprises initially turning off one or more of a plurality of electric thrusters turned off so they can be turned on at a later time to give increased acceleration capability in the presence of disturbances experienced by the spacecraft.

15. The method recited in claim 2 wherein the step of firing the electric propulsion thrusters to raise the orbit of the spacecraft comprises pre-planned electric thruster coast periods that are selectively shortened or lengthened in duration to compensate for disturbances experienced by the spacecraft.

16. The method recited in claim 2 wherein the step of firing the electric propulsion thrusters to raise the orbit of the spacecraft comprises adjusting attitude steering profiles using a plurality of momentum wheels.

17. The method recited in claim 2 wherein the step of firing the electric propulsion thrusters to raise the orbit of the spacecraft comprises pointing the resultant thrust vector away from the center of mass of the spacecraft.

18. The method recited in claim 17 wherein gimbals are used to point the thrusters away from the center of mass of the spacecraft to provide control torque.

19. The method recited in claim 17 wherein one or more thrusters are differentially throttled to point the resultant thrust away from the center of mass of the spacecraft to provide control torque.

20. The method recited in claim 17 wherein one thruster on either the North or South side of the spacecraft is used to increase the effective thrust and decrease the duration of the electric orbit raising phase to raise the spacecraft from the orbit achieved by the chemical propulsion thrusters firing step to near geosynchronous orbit.

21. The method recited in claim 17 wherein at least two adjacent thrusters on either the North or South side of the spacecraft are used to increase the effective thrust and decrease the duration of the electric orbit raising phase to raise the spacecraft from the orbit achieved by the chemical propulsion thrusters firing step to near geosynchronous orbit.

22. A system for raising a spacecraft launched into a transfer orbit about the Earth from the transfer orbit to a geosynchronous orbit, comprising:

a spacecraft comprising chemical and electric propulsion thrusters and a solar array;

a processor onboard the spacecraft for:

firing the chemical propulsion thrusters at apogees of intermediate orbits, starting from the transfer orbit initiated by the launch vehicle, to successively raise perigees of the orbit until the spacecraft perigee substantially clears the Van Allen radiation belts, and where the semi-major axis of the intermediate orbits is substantially less than the semi-major axis of a final orbit, and where the inclination of the intermediate orbits is substantially greater than the inclination of the final orbit;

firing the electric propulsion thrusters to raise the orbit of the spacecraft from the orbit achieved by the chemical propulsion thrusters firing step to near geosynchronous orbit by steering the thrust vector both in-plane and out-of-plane while rotating the spacecraft body and steering the solar array to maintain the sun's illumination on the solar array; and firing selected ones of the chemical and electric propulsion thrusters to achieve final geosynchronous orbit.

23. The system recited in claim 22 wherein the spacecraft comprises a processor that generates a thruster firing profile for firing the thrusters that is generated onboard the spacecraft.

24. The system recited in claim 23 wherein the processor generates a spacecraft steering profile onboard the spacecraft that steers a thrust vector ($\Delta V$) to maintain the illumination of the sun's rays substantially normal to solar arrays of the spacecraft.

25. The system recited in claim 22 further comprising:

ground apparatus including a processor that determines a thruster firing profile for firing the thrusters and generates thruster firing commands that implement the thruster firing profile, and communication apparatus that uplinks commands to the spacecraft.

26. The system recited in claim 25 wherein the processor in the ground apparatus determines a spacecraft steering profile for steering the thrust vector to maintain the illumination of the sun's rays substantially normal to solar array and generates spacecraft steering commands that implement the spacecraft steering profile, and wherein the communication apparatus uplinks spacecraft steering commands to the spacecraft.

* * * * *